United States Patent [19]

Galletly

[11] Patent Number: 4,739,441

[45] Date of Patent: Apr. 19, 1988

[54] SWITCHGEAR ASSEMBLY

[75] Inventor: George Galletly, Chambly, Canada

[73] Assignee: Westinghouse Canada Inc., Hamilton, Canada

[21] Appl. No.: 901,516

[22] Filed: Aug. 28, 1986

[51] Int. Cl.⁴ .............................................. H02B 1/20
[52] U.S. Cl. ................................... 361/341; 174/68 B
[58] Field of Search ............... 361/341, 342, 355, 361, 361/332, 333; 174/68 B, 70 B, 72 B, 88 B

[56] References Cited

U.S. PATENT DOCUMENTS 4,242,718 12/1980 Shariff et al. ........................ 361/341

FOREIGN PATENT DOCUMENTS 1025073 1/1978 Canada .

Primary Examiner—Roy N. Envall, Jr.
Attorney, Agent, or Firm—E. H. Oldham

[57] ABSTRACT

This invention relates to a power distribution arrangement in a large metal enclosed switchgear assembly. Electric current is carried from a source to a group of circuit breakers in the switchgear enclosure by means of two separate sets of bus bars to produce a ring bus effect. Vertical bus is connected to the source bus to carry power to the line side of the circuit breakers in the assembly. The load conductor of each circuit breaker returns via an aperture in the line bus and passes therethrough, but does not contact the line bus. Both sets of bus feeding the circuit breakers are mounted so as to have their major surfaces parallel.

6 Claims, 3 Drawing Sheets

SWITCHGEAR ASSEMBLY

FIELD OF THE INVENTION

This invention relates to metal enclosed switchgear assemblies used to distribute electrical power from buses to a plurality of loads.

DESCRIPTION OF THE PRIOR ART

When a large bank of circuit breakers are used to distribute power from a number of buses to a variety of loads, it has been typical in the past to arrange the breakers in a "four high" stacked relationship in a metal enclosure which is subsequently divided into groups of "four high" cells, and connect the various circuit breakers of each cell by means of buses. The buses are usually located at the rear of the enclosure and isolated from the circuit breaker cells by a metallic wall for safety reasons. The source, which may be a transformer or another circuit breaker, is connected via buswork to the various distribution circuit breakers so that current passes through the circuit breakers to the loads. In the past, the main buses, carrying power from the source would normally be arranged horizontally either at the top, the middle, or the bottom of the assembly with the plane of the buses parallel to the plane of the back and front walls of the assembly. The various circuit breakers were then connected to the main buses by means of vertical buses and the planes of the major surfaces of these buses were perpendicular to the planes of the main buses in the rearward portion of the enclosure. This resulted in a number of vertical riser buses with the planes of the major surfaces perpendicular to the main wall of the assembly and they may be referred to as "edge mounted". In order to provide space for the return bus from the circuit breakers to the load, it was necessary to space the vertical riser "edge mounted" buses in a particular arrangement with spaces in between sufficient to permit the return load bus to pass between the vertical riser buses of the same phase. Because a number of circuit breakers may be connected to any vertical bus, the vertical riser buses frequently had to consist of a number of parallel bars to carry the total load of the multiple circuit breakers. The horizontal or supply buses had to be fully rated for their entire length as did the vertical buses. It was not uncommon for the supply busses, therefore, to consist of a number of parallel bars in order to have a sufficient rating but as will be understood, when a plurality of buses are mounted adjacent to each other, even though carrying the same load, they must be derated because of the proximity effects. It will also be seen that because the vertical riser buses are "edge mounted", the whole bus assembly must be spaced a substantial distance from the walls of the enclosure and therefore, will require elongated insulators to support the bus assembly, such supports must be sufficiently rigid to withstand short circuit stresses.

SUMMARY OF THE INVENTION

In accordance with the present invention, both the supply buses and the vertical riser buses are placed with their major surfaces in parallel planes spaced a sufficient distance to provide the required spacing between the riser buses and the supply buses. Rather than being provided with a single set of supply buses as done in the prior art, it is proposed to use an upper and lower set of horizontal bus bars, an upper set of riser bus bars and a lower set of riser bus bars plus shunt connectors strategically connected between the upper and lower risers at locations which ensure even current distribution. The load buses from the circuit breaker are returned to the rear of the assembly through suitable perforations in the riser buses. This avoids the necessity of providing spaces between the riser buses for the load buses, as in the prior art. This provision, i.e. the use of both upper and lower supply buses to produce a ring bus effect, means that the supply buses are not required to have as high a current rating as they would otherwise, and with the proposed bus arrangement, each supply bus is rated only at half the total load. Similarly, the riser buses may be reduced in rating since they are fed at points between the connection at each pair of breakers in the stacks. A co-planer arrangement of the riser buses and the main buses also permits a reduction of the distance of the entire bus assembly from the cell wall which in turn reduces the lengths of the needed supporting insulators. The particular arrangement also permits standardization of the various components, such as the riser tap-off blocks which connect to the riser buses to the horizontal supply buses.

Figure 1A:
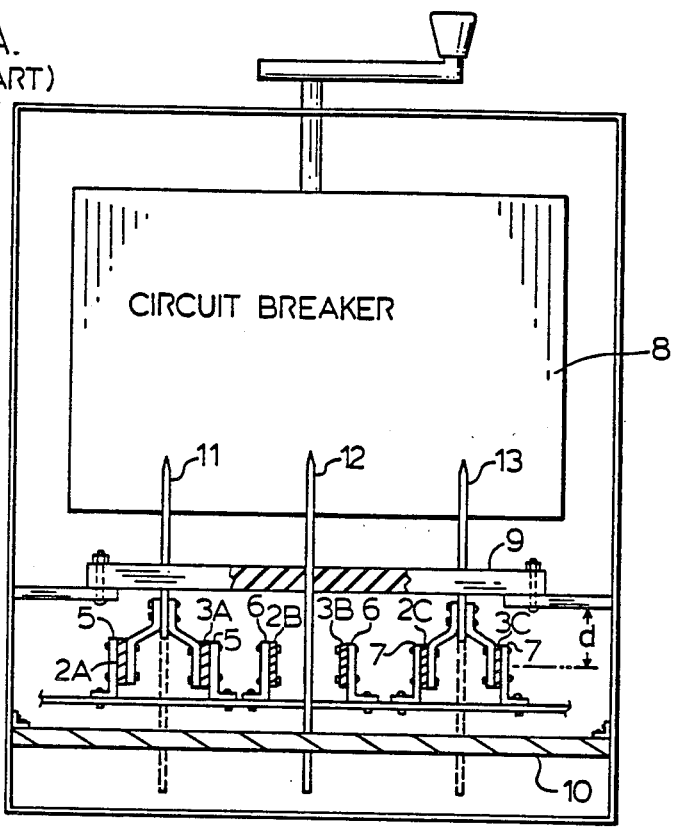
FIGS. 1A and 1B are plan and elevation views of a portion of a switchgear assembly in accordance with the prior art.
Figure 1B:
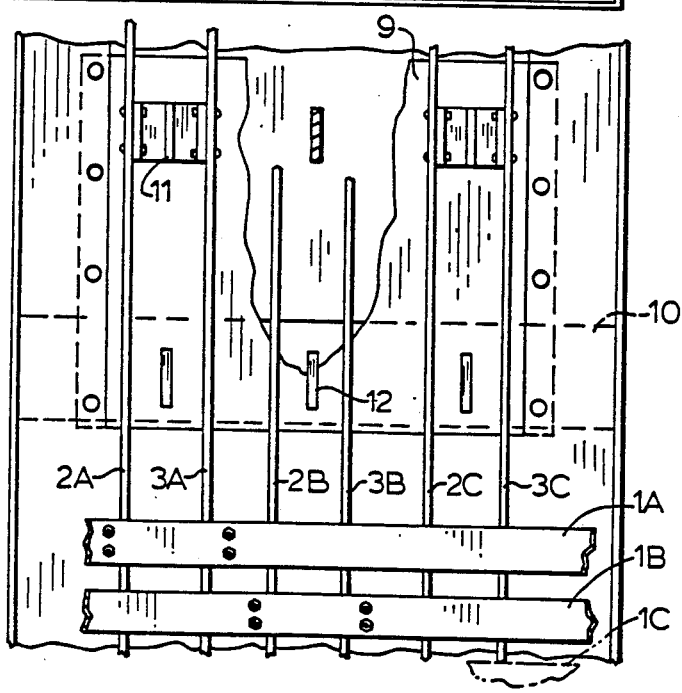

As will be seen from FIGS. 1A and 1B in the prior art construction, a plurality of bus bars 1A, 1B and 1C, being the three phases of the supply, are mounted at the bottom of a metallic enclosure. Although only a single bus bar per phase is shown it may be assumed that in actual practice it is not unusual to use several bars in a parallel spaced relationship in order to obtain the desired current carrying capability.

From each of the buses 1A, 1B and 1C, a number of vertical riser buses 2A, 3A, 2B, 3B, 2C, 3C are connected to buses 1A, 1B, 1C respectively, by suitable angle members as shown in FIG. 1A, designated 5, 6 and 7. As may be seen in FIG. 1A, a circuit breaker 8 is shown suitably mounted in the front cubicle of the enclosure. Circuit Breaker 8 is shown for illustration purposes only, and there may be several circuit breakers mounted in a vertical stacked arrangement and each will be fed from the vertical risers. The line side of each phase of breaker 8 is connected by means of terminals to its associated riser bus. For example, the line side of Phase A is connected through terminal 11 to risers 2A and 3A. In a similar manner phases B and C are connected to riser buses 2B and 3B, 2C and 3C respectively. As will be seen the riser buses are spaced a substantial distance from the frame of the assembly as shown by distance "d" thus require substantial support to prevent deflection under short circuit conditions. Also because each of the riser buses must carry and be rated for the total full load of all the circuit breakers connected to that riser, it may require a plurality of bars paralleled in a spaced configuration such as bars 2A and 3A, which are closely spaced adjacent to each other and therefore must be derated due to the proximity effects. It will also be seen that the centre space between the riser buses of the same phase is also predetermined because the space between the riser buses must be sufficient for the passage of the load conductor buses there between such as bar 12 connected to circuit breaker 8, which passes between riser buses 2B and 3B to the rear of the assembly for connection to the load. The load terminals are mounted in insulators 9 and 10.

DESCRIPTION OF THE PREFERRED EMBODIMENT

Figure 2A:
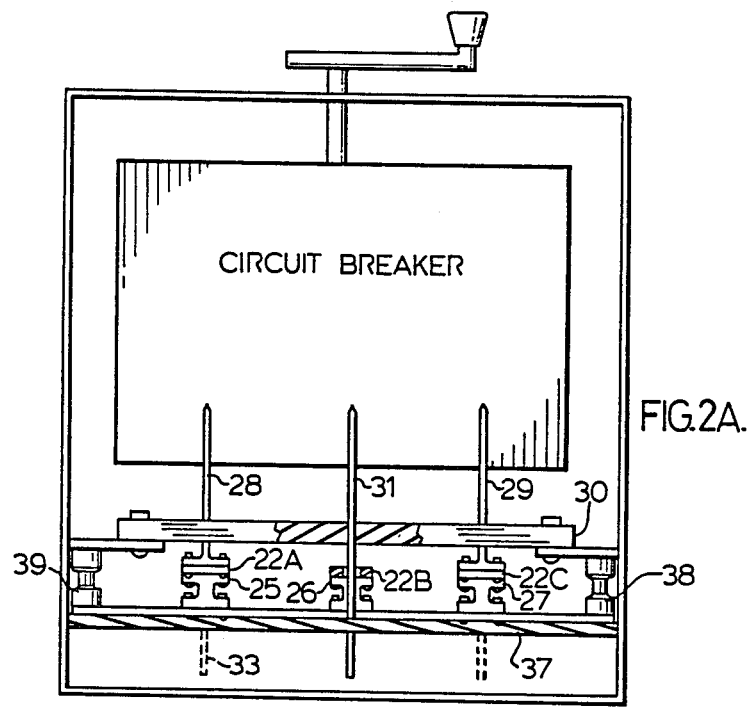
FIGS. 2A, 2B and 2C are a top plan view, a back elevation and a side elevation of a switchgear assembly in accordance with the present invention.
Figure 2B:
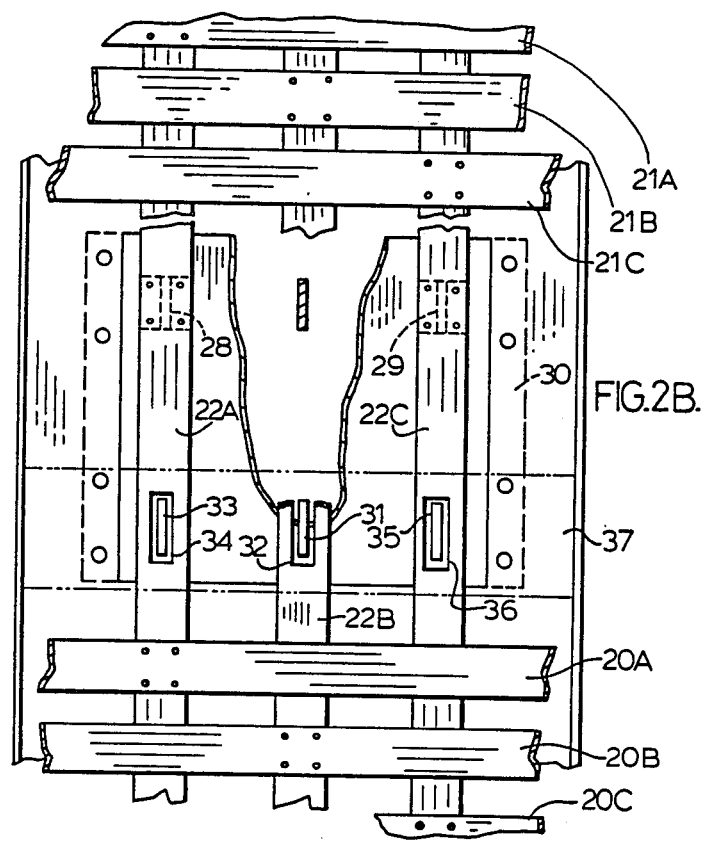
Figure 2C:
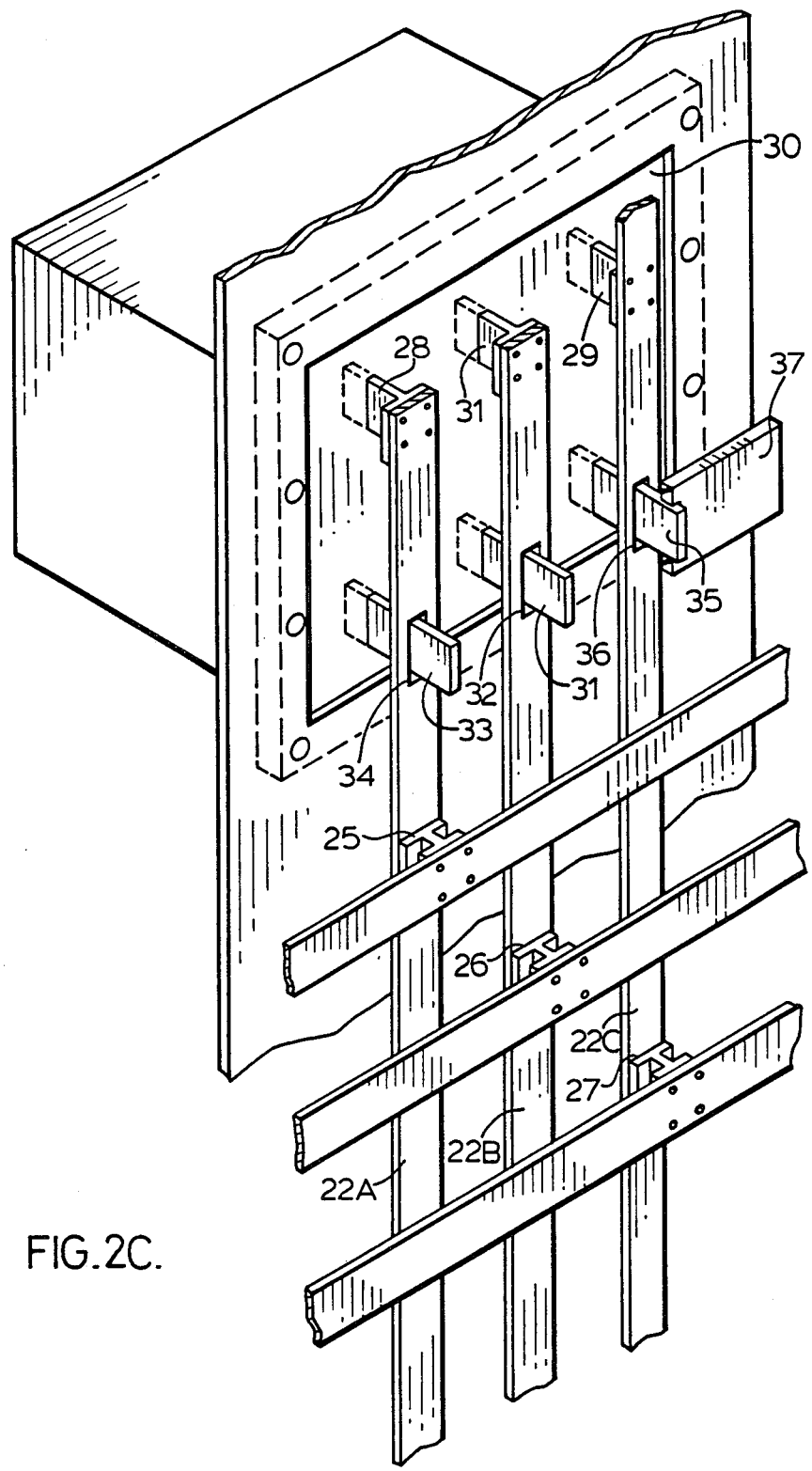

Turning now to FIG. 2, the improved arrangement in accordance with the present invention is illustrated in FIG. 2A in a top plan, FIG. 2B in a rear elevation and FIG. 2C, a side elevation partially in section.

As will be seen, a plurality of supply buses 20A, 20B and 20C connect the source to the various phases of each cell of the system at preselected points on the lower section of the vertical risers. These correspond to the buses 1A, 1B and 1C in the prior art. However, it will be seen there is a further set of buses at the top of the arrangement 21A, 21B and 21C which interconnect all the cells at preselected points on the upper section of the vertical risers, thus providing a ring main and equalizing the current through the various buses. Vertical riser buses 22A, 22B and 22C interconnect between corresponding supply buses that is, riser bus 22A interconnects horizontal supply bus 20C and 21C. Similarly, riser bus 22B interconnects horizontal supply bus 20B and 21B. Note that this view shows the vertical risers extending the entire height of the enclosure. This need not always be the case. In most instances, when the circuit breakers are arranged in groups of stacks of "four high" stacked arrangement, the top set of horizontal bus will be connected to the mid points of a set of vertical risers which feed only the two top breakers in the stack of that particular "four high" group. Similarly the lower set of horizontal bus bars is connected to the mid points of the lower set of the vertical risers which feed the two lowermost circuit breakers of the "four high" group.

If the enclosure is large there will be many groups of "four high" stacks of circuit breakers arranged in side by side relationship, and the top set of bus bars will feed all the mid points of all the top sets of bus bars and similarly the lower horizontal bus bars feed all the mid points of all the lower sets of vertical risers.

It will be seen immediately that the upper and lower sets of risers must be interconnected at or near the ends of the horizontal sets in order to achieve the "ring bus" effect in order to achieve current balancing. Connection between the other sets of vertical risers at points between the end risers is not required, and the configuration of 2B is only required at or near the ends of bars 20A, 21A and 20B, 21B and 20C and 21C.

This connection improves the current distribution in the system and each set of vertical risers is connected in such a manner that the vertical risers need only be rated to carry the rated current of the largest circuit breaker connected to that particular vertical riser. (In the prior art arrangement, the vertical risers were required to carry the sum of the rated currents of the breakers arranged in the stack of "four high" breakers.)

It will be seen the riser buses 22A, 22B and 22C occupy a common plane parallel to the plane of the supply buses 20A, 20B and 20C. As will be more clearly seen in FIG. 2A, the vertical riser buses are connected to the horizontal supply buses by means of sections of extruded "I" beams 25 and 26, which are bolted to the buses, thus maintaining the vertical riser buses in fixed relationship to the horizontal supply buses. (Connection between the "B" phase is not shown in FIG. 2A.)

A circuit breaker corresponding to the circuit breaker 8, in prior art, is connected to the vertical riser buses 22A, 22B and 22C by means of suitable connections such as terminal connectors 28 and 29 which are bolted to vertical riser bus 22A and 22C and pass through insulating block 30. The line side phases of the circuit breaker are fed at the top of insulating block 30 while the load side phases of the circuit breaker 8 are fed through the lower part of insulator 30 via terminals such as 31 which then passes through an aperture 32 in riser bus 22B. This aperture is sufficient to permit the terminal 31 to pass through and yet to provide adequate isolation between the load and line side of the circuit breaker, while the circuit breaker is in the open condition.

It will also be noted that the terminals 31, 33 and 35 are rigidly mounted in insulating block 30 and in a further insulating block 37, which ensures that they maintain their spacing from the sides of the apertures 32, 34 and 36. The various loads may now be suitably connected to terminals 31, 33 and 35 at points where they extend beyond the insulating block 37.

In a similar manner the three other circuit breakers of the "four high" stack (not illustrated) are connected between risers 22A, 22B and 22C and various other loads. As will be more clearly seen in FIG. 2A the horizontal buses such as bus 20A are supported by means of stand-off insulators 38 and 39, which are securely bolted to the cabinet frames and to the bus 20A. Since the riser buses are firmly bolted to the horizontal supply buses and also to the terminals such as 28 and 29, the vertical riser buses are firmly and rigidly supported. The insulating plates 30 and 37 are similarly bolted to the frame of the cabinet assembly by means of suitable brackets.

It will be noted that with the arrangement provided, the current in both the horizontal buses and in the vertical buses is evenly distributed due to the ring arrangement. Bus 22 for example, is effectively fed from both ends of the switchgear. It will also be noted that due to the arrangement of the vertical riser buses, the assembly can be reduced in depth and the buses rigidly supported by means of the short stand-off insulators 38 and 39 and the connection of the riser buses to the horizontal terminal members.

In the presence of short circuits, the forces involved can be adequately accepted by the various buses because of their rigid support. It will also be noted that because the return or load side of the breaker is connected by connectors such as 31, 33 or 35 which pass completely through the riser buses, there is no need to space the riser buses apart to accept the load buses as in the prior art. This means that the riser buses can be equally spaced across the back of the assembly making it easier to support them rigidly. It has been found that the apertures in the riser buses do not give rise to undue current concentration or heat rise in the areas adjacent the aperture and the buses do not have to be derated because of the presence of the apertures. The overall depth of the enclosure is substantially reduced.

While the invention has been described in association with the particular embodiment, it will be understood that many variations can be made within the scope of this invention. The exact formation of the various support members and connectors will obviously be a matter of choice and the shape and size of the various buses and conductors will depend upon the particular application and material used. Due to material limitations, it may be necessary in some cases to use a plurality of bars to form each one of the buses, for example bus 20A could consist of two or three bars of copper or aluminium, similarly riser buses 22, 23 and 24 could consist of a number of identical parts bolted together.

It will also be evident to those skilled in the art that this bus arrangement may be utilized on motor control centres with the same facility as metalclad switchgear.

The embodiments of the invention in which an exclusive property or privilege is claimed are defined as follows:

1. In a system distributing multiphase electric power to a plurality of loads, a metalclad switchgear enclosure, a bus bar arrangement carrying power from a source to various loads via circuit controlling devices, a first set of bus bar members carrying electric power to said circuit controlling devices, a second set of bus bars carrying electric power from said circuit controlling devices to various loads, said first set of bus bars being provided with apertures therein to permit the second set of bus bars to pass through said apertures in said first set of bus bars.

2. A multi phase power distribution network comprising a plurality of bus bars for connecting a power source to a number of loads via suitable circuit protecting devices, arranged in a stacked "four high" relationship in said network, said bus bars being arranged in a ring bus arrangement such that first sets of bus bars are arranged to extend in a vertical direction and be connected to the line side of each group of circuit breakers in the network, a pair of horizontally extending sets of bus bars connected to the first sets of bus bars at predetermined points to form a ring arrangement, power source connected to one of said second sets for energization of said bus, apertures of a predetermined size and shape being formed at predetermined locations on said first sets of bus bar for passage of load current carrying members therethrough, said load current carrying members being connected to the load side of said circuit protecting devices and to various loads supplied by said distribution network.

3. A multi phase power distribution network as claimed in claim 2 in which the major surfaces of said first and second sets of bus bars are parallel to one another.

4. In a metal enclosed switchgear assembly for distributing electrical current from a source to a plurality of loads;

a first set of supply bus bars arranged horizontally at the lower portion of the assembly in a common plane parallel to the plane of the back of the assembly;

a second set of horizontal bus bars arranged in the same plane as the first set at the top of the enclosure;

a first set of vertical risers connected to said first set of horizontal bus bars; a second set of vertical risers connected to second set of horizontal bus bars; said first and second sets of vertical risers being connected at predetermined locations for current equalization purposes, means to connect said vertical risers to a plurality of circuit breakers and means to connect said circuit breakers to loads, said means to connect said circuit breakers to said loads comprising bar connectors arranged in planes perpendicular to the planes of said bus bars; each of said bar connectors passing through an aperture in its associated bus bar which is connected to the same circuit breaker as said bar connector; means to rigidly support said horizontal bus bars by insulating means from the structure of said metal enclosure and means to insulatively support said bar connectors from the frame of said structure, where by the relative positions of said bar connectors, said vertical bus bars and said horizontal bus bars are rigidly maintained.

5. In a metal enclosed switchgear assembly of the stacked "four high" configuration for distributing electric power from a source to a plurality of loads an upper set of vertically extending bus bars connected to the line side of each circuit breaker of the top two circuit breakers of each group in the stack;

a lower set of vertically extending bus bars connected to the line side of each circuit breaker of the lower two circuit breakers of each group in the stack;

a pair of sets of horizontally extending bus bars connected to said vertically extending sets of bus bars such that, the upper set of said horizontally extending bus bars is connected to feed each of the upper sets at points between the connection of the upper two circuit breakers of the stack;

the lower set of said horizontally extending bus bars is connected to feed each of the lower sets at points between the connection of the lower two circuit breakers of the stack.

6. An assembly as claimed in claim 5 wherein the upper and lower sets of vertically extending bus bars are joined together at each end of the horizontally extending bus bars to produce a "ring" effect.

* * * * *